United States Patent Office 3,551,477
Patented Dec. 29, 1970

3,551,477
NOVEL BISCARBAMATES
Karl-Heinz Koenig, Ludwigshafen (Rhine), Gustav Steinbrunn, Schwegenheim, Pfalz, Hermann Windel, Frankenthal, Pfalz, and Adolf Fischer, Mutterstadt, Pfalz, Germany, assignors to Badische Anilin- & Soda-Fabrik Aktiengesellschaft, Ludwigshafen (Rhine), Germany
No Drawing. Filed June 27, 1967, Ser. No. 649,097
Claims priority, application Germany, July 6, 1966, 1,568,138
Int. Cl. C07c 101/44
U.S. Cl. 260—472                                           4 Claims

ABSTRACT OF THE DISCLOSURE

Biscarbamates and their use for controlling undesirable plant growth.

---

The present invention relates to biscarbamates, in particular phenyl-substituted biscarbamates, and to a method for controlling unwanted plants with said compounds.

It is known that N-3,4-dichlorophenylmethyl carbamate may be used for controlling unwanted plants. However its action is not satisfactory.

An object of the present invention is to provide new carbamates which have an excellent herbicidal action. A further object of the invention is to provide a method for controlling unwanted plants with said bicarbamates.

These and other objects of the invention are achieved with biscarbamates having the formula

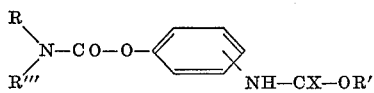

in which X denotes oxygen or sulfur, R' denotes an aliphatic radical which may be substituted by chlorine, bromine or methoxy or ethoxy groups, R denotes an aliphatic radical which may be substituted by chlorine, bromine or methoxy or ethoxy groups, a naphthyl radical, a benzyl radical or the radical

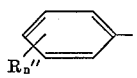

in which $n$ is one of the integers 0 to 3, R'' denotes halogen, a lower alkyl group, the trifluoromethyl group, a lower alkoxy group, a methylsulfonyl, nitro, dialkylamino, cyano, carboxy, carbalkoxy or carbamoyl group, or a cycloaliphatic radical which may be substituted by a lower alkyl group, or a bicyclic or tricyclic cycloaliphatic radical and R''' denotes hydrogen or a lower alkyl radical.

Most of the new compounds are readily crystallizable products which have a good herbicidal action. They are effective for both selective and total control of plants. Herbicidal agents are obtained by mixing the active ingredients with conventional solid or liquid carriers.

The process for the preparation of the new compounds proceeds according to the general Equation $a$ or $b$.

(a)
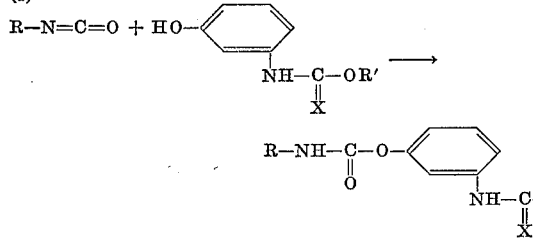

(b)
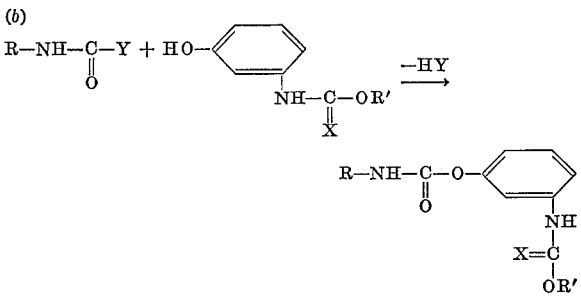

in which X, R and R' have the meanings given above while Y denotes chlorine or bromine.

Examples of suitable starting materials for the process according to the invention are m-hydroxyphenyl carbamates which are reaction products of methyl, ethyl, propyl, isopropyl, butyl, isobutyl, isoamyl, allyl, methallyl, buten-(1)-yl-(3), butyn-(1)-yl-(3), or thiomethyl, thioethyl, thiopropyl, thiobutyl or thioisobutyl chlorocarbonate with m-aminophenyl. They may be prepared in the presence of hydrogen chloride binders, e.g. tertiary amines or alkali metal carbonates.

Suitable isocyanates for use as starting materials in the process according to the invention are β-chloroethyl, isopropyl, 3-methylcyclohexyl, cyclooctyl, cyclododecyl, 2,4-dimethylcyclohexyl, cyclohexyl, o-chlorophenyl, m-chlorophenyl, p-chlorophenyl, o-methylphenyl, m-methylphenyl, p-methylphenyl, xylidyl, o-, m-, p-anisidyl, m-, p-fluorophenyl, m-, p-bromophenyl, p-iodophenyl, 3,4-dichlorophenyl, 3-chloro-4-bromophenyl, 4-chloro-3-bromophenyl, 4-chloro-3-methylphenyl, 3-chloro-4-methylphenyl, 2-chloro-3-methylphenyl, m-, p-trifluoromethylphenyl, 4-chloro - 3 - trifluoromethylphenyl, 4-bromo-3-trifluoromethylphenyl, 3-nitrophenyl, 4-chloro-3-nitrophenyl, m-cyanophenyl, o-carbomethoxyphenyl, m-carboamidophenyl, m-carboethoxyphenyl and p-methylsulfonylphenyl isocyanate. The carbamic acid halides corresponding to the isocyanates may also be used.

The reaction according to the invention of the two starting materials is carried out in solution, indifferent solvents, such as dioxane, tetrahydrofuran, ethers, hydrocarbons and chlorobenzene, being used. The reaction is carried out at temperatures between 15° and 150° C., preferably between 30° and 80° C. Approximately equivalent amounts of the two starting materials are used. The reaction with the carbamic acid halide takes place in the presence of an acid binding agent, e.g. a tertiary amine, aminoalcohol, alkali metal alcoholate, alkali metal carbonate or alkali metal hydroxide.

The reactions according to the invention are illustrated by the following examples in which parts are parts by weight unless otherwise specified.

EXAMPLE 1

18.7 parts of m-trifluoromethylphenyl isocyanate is dripped while stirring at 40° to 50° C. into 16.7 parts of methyl N-m-hydroxyphenyl carbamate dissolved in 50 parts by volume of tetrahydrofuran and a trace of triethylamine. The reaction is completed after three hours at 60° to 70° C. Some of the solvent is evaporated in vacuo and after petroleum ether has been added the reaction product is obtained in crystalline form.

31 parts of 3-(3'-trifluoromethylphenylcarbamoyl)- hydroxyphenylmethyl carbamate is obtained having a melting point of 157° to 158° C. and the formula:

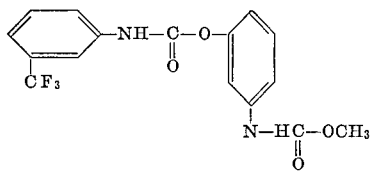

EXAMPLE 2

13.7 parts of p-fluorophenyl isocyanate is dripped while stirring at 30° to 40° C. into 16.7 parts of methyl N-m-hydroxyphenyl carbamate dissolved in 50 parts by volume of dioxane and a trace of sodium methylate, the reaction proceeding only partially. To complete the reaction the mixture is heated for some hours at 60° to 70° C. Some of the solvent is distilled off in vacuo and after petroleum ether has been added 3-(4'-fluorophenylcarbamoyl)-hydroxyphenylmethyl carbamate is obtained in crystalline form. The yield is 29 parts and the substance has a melting point of 161° to 163° C.

EXAMPLE 3

14.9 parts m-anisidyl isocyanate is dripped while stirring at 35° to 45° C. into 16.7 parts of methyl N-m-hydroxyphenyl carbamate dissolved in 50 parts by volume of tetrahydrofuran and a trace of pyridine. After some of the solvent has been removed in vacuo, petroleum ether is added and 3-(3'-anisidylcarbamoyl)-hydroxyphenylmethyl carbamate is obtained in crystalline form in a yield of 30 parts with a melting point of 131° to 133° C. If m-toluyl isocyanate is used instead of m-anisidyl isocyanate and the same procedure followed as described above, 3-(3'-toluylcarbamoyl)-hydroxyphenylmethyl carbamate with a melting point of 132° to 133° C. is obtained.

EXAMPLE 4

If 4-chloro-3-trifluoromethylphenyl isocyanate is used instead of m-anisidyl isocyanate in the process according to Example 3 3-(4'-chloro-3'-trifluoromethylphenylcarbamoyl)-hydroxyphenylmethyl carbamate with a melting point of 184° to 186.5° C. is obtained.

EXAMPLE 5

10.3 parts of isobutyn-(1)-yl-(3) m-hydroyphenyl carbamate and a drop of triethylamine are dissolved in 20 parts by volume of tetrahydrofuran. Beginning at 30° C. 8.2 parts of m-toluyl isocyanate is dripped into this solution while stirring and the reaction is allowed to continue for some time at 60° to 65° C. The solvent is distilled off in vacuo and the residue is recrystallized from methylene chloride. 17 parts of 3-(3'-toluylcarbamoyl)-hydroxyphenylisobutyn-(1)-yl-(3) carbamate is obtained with a melting point of 136° to 138° C. and the following formula:

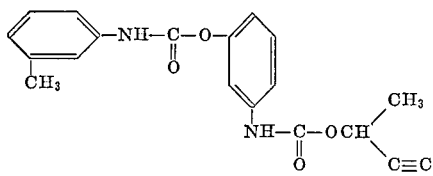

If m-anisidyl isocyanate is used instead of m-toluyl isocyanate, but otherwise the same procedure is followed, 3-(3' - anisidylcarbamoyl) - hydroxyphenylisobutyn-(1)-yl-(3) carbamate is obtained with a melting point of 135° to 138° C.

EXAMPLE 6

5 parts of pyridine is added to 8.35 parts of methyl N-m-hydroxyphenyl carbamate dissolved in 50 parts by volume of dioxane, and while stirring at 25° to 30° C. 8.5 parts of N-methyl-N-phenylcarbamic acid chloride, dissolved in 30 parts by volume of dioxane, is dripped into the above solution. The mixture is then heated for three days under reflux. After cooling, the chlorohydrate is separated by filtration, the solution is evaporated and 13.5 parts of 3-(N-methyl - N - phenylcarbamoyl) - hydroxyphenylmethyl carbamate with a melting point of 124° to 126° C. is obtained.

Some of the new compounds are listed below with their melting points, R, X, R' and R" denoting the various substituents of these compounds and R''' denoting hydrogen.

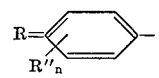

| X | R" | R" | n | R' | M.P., ° C. |
|---|---|---|---|---|---|
| 0 | 3'-Cl— | --------------- | 1 | —CH₃ | 152-154 |
| 0 | 3'-CH₃ | 5'-CH₃ | 2 | Same | 155-157 |
| 0 | 2'-Cl | --------------- | 2 | do | 120-122 |
| 0 | X'-Cl | 3'-NO₂ | 1 | do | 220-225 |
| 0 | 2'—COCH₃ (‖ O) | --------------- | 1 | do | 189-191 |
| 0 | 2'-Cl | 3'-CH₃ | 1 | do | 141.5-143 |
| 0 | 3'-Cl | 4'-CH₃ | 1 | do | 171.5-172.5 |
| 0 | 4'-Cl | --------------- | 1 | do | 177-178 |
| 0 | 3'-Cl | 4'-Cl | 1 | do | 189-191 |
| 0 | 4'-I | --------------- | 1 | do | 183-184 |
| 0 | 4'-F | --------------- | 1 | —C₄H₅ | 162-163 |
| 0 | Same | --------------- | 1 | —C₃H₇i | 158-160 |
| 0 | 3'-CH₃ | --------------- | 1 | Same | 136-138 |
| 0 | 4'-Br | 3'-Cl | 2 | —CH₃ | 193-194 |
| 0 | 4'-CH₃ | 2'-CH₃ | 2 | Same | 156-158 |
| 0 | 4'-OCH₃ | 2'-OCH₃ | 2 | do | 153-154 |
| 0 | 5'-Cl | 2'-CH₃ | 2 | do | 154-155 |
| 0 | 5'-NO₂ | --------------- | 1 | do | 163-164 |
| 0 | 5'-NH₂ | --------------- | 1 | do | 118-120 |
| 0 | | | 0 | do | 144-145 |
| 0 | 4'-Br | 3'-Br | 2 | do | 146-147 |
| 0 | Same | --------------- | 1 | do | 177-178 |
| 0 | 4'-Cl | 2'-CH₃ | 2 | do | 170-171 |
| 0 | 4'-CH₃ | 5'-OCH₃ | 2 | do | 156-157 |
| 0 | 4'-Cl | 5'-Br | 2 | do | 149-150 |
| 0 | 4'-CH₃ | 5'-CH₃ | 2 | do | 159-160 |
| 0 | 4'-Br | 5'-CF₃ | 2 | do | 181-183 |
| 0 | 4'-Cl | 5'-OCH₃ | 2 | do | 115-116 |
| 0 | 5'-CF₃ | --------------- | 1 | do | 157-158 |
| 0 | 5'-CH₃ | --------------- | 1 | do | 133-134 |
| 0 | 3'-OCH₃ | 5'-OCH₃ | 2 | do | 114-115 |
| 0 | 4'-Cl | 5'-CF₃ | 2 | do | 184-186 |
| 0 | 4'-CH₃ | 3'-Cl | 2 | do | 171.5-172.5 |
| 0 | 4'-Cl | --------------- | 1 | do | 177-178 |
| 0 | Same | 3'-Cl | | do | 189-191 |
| 0 | 4'-F | --------------- | 1 | do | 162-163 |
| 0 | 3'-OCH₃ | --------------- | 1 | do | 132-133 |
| 0 | 3'-CH₃ | 5'-CH₃ | 2 | do | 156-157 |
| 0 | 2'-Cl | 3'-CH₃ | 2 | do | 141.5-142.5 |
| 0 | 2'-isopropyl | --------------- | 1 | do | 115-116 |
| 0 | 3'-Br | 4'-F | 2 | do | 134-135 |
| 0 | 5'-Cl | --------------- | 1 | do | 153-154 |
| 0 | 4'-F | --------------- | 1 | —CH(CH₃)(CH₃) | 162-163 |
| 0 | 3'-OCH₃ | --------------- | 1 | Same as above | 135-137 |
| 0 | 3'-CH₃ | --------------- | 1 | do | 136-138 |
| 0 | 4'-F | --------------- | 1 | —CH(CH₃)(CH₃) | 158-160 |
| 0 | 3'-CH₃ | --------------- | 1 | Same as above | 137-138 |
| 0 | 4'-F | 5'-Br | 2 | do | 139-142 |
| 0 | Same as above | Same as above | 2 | —CH(CH₃)(C≡CH) | 115-117 |

| X | R' | R'' | R''' | n | R' | M.P., °C. |
|---|---|---|---|---|---|---|
| 0 | 2'-CH$_3$ | | | 1 | CH$_3$ | 149-150 |
| 0 | 2'-OCH$_3$ | 4'-Cl | 5'-OCH$_3$ | 3 | CH$_3$ | 151-152 |
| 0 | 4'-CH$_3$ | | | 1 | CH$_3$ | 160-162 |
| 0 | 2'-Cl | 3'-Cl | | 2 | CH$_3$ | 143-144 |
| 0 | 2'-CH$_3$ | 5'-NO$_2$ | | 2 | CH$_3$ | 109-113 |
| 0 | 2'-CF$_3$ | 4'-Cl | | 2 | CH$_3$ | 139-143 |
| 0 | 3'-F | | | 1 | CH$_3$ | 155-158 |
| 0 | 2'-Cl | 3'-Cl | | 2 | CH$_3$ | 175-178 |
| 0 | 3'-CH$_3$ | 6'-Cl | | 2 | CH$_3$ | 140-143 |
| 0 | 3'-Cl | 5'-Cl | | 2 | CH$_3$ | 175-177 |
| 0 | 2'-Cl | 4'-NO$_2$ | | 2 | CH$_3$ | 159-160 |
| 0 | 3'-CF$_3$ | 6'-Cl | | 2 | CH$_3$ | 128-129 |
| 0 | 2'-OCH$_3$ | 4'-OCH$_3$ | 5'-Cl | 3 | CH$_3$ | 142-143 |
| 0 | 4'-O—⟨phenyl⟩—Cl | | | 1 | CH$_3$ | 172-176 |
| 0 | 3'-NH$_2$·HCl | | | 1 | CH$_3$ | 179-182 |
| 0 | 2'-OCH$_3$ | 4'-Cl | | 2 | CH$_3$ | 113-116 |
| 0 | 3'-CH$_2$Cl | 4'-Cl | | 2 | CH$_3$ | 158-159 |
| 0 | 2'-OCH$_3$ | 5'-OCH$_3$ | | 2 | CH$_3$ | 112-116 |

| X | R | R' | M.P., °C. |
|---|---|---|---|
| 0 | α-naphthyl | —CH$_3$ | 170 to 171. |
| 0 | 2-methylcyclohexyl | Same as above | 166 to 167. |
| 0 | 2-ethylhexyl | do | Syrup. |
| 0 | cyclooctyl | do | 98 to 100. |
| 0 | benzyl | do | 132.5 to 134. |
| 0 | tetrahydrodicyclopentadienyl | do | Syrup. |
| 0 | 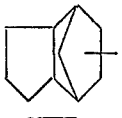 | do | 99 to 101. |
| 0 | 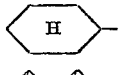 | do | 153 to 155. |
| 0 | 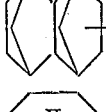 | do | 154 to 156. |
| 0 | 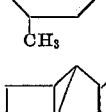 | do | 166 to 167. |
| 0 | 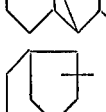 | do | 159 to 161. |
| 0 | 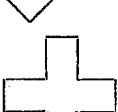 | do | 182 to 183. |
| 0 | 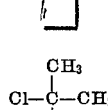 | do | 104 to 105. |
| 0 | Cl—C(CH$_3$)$_2$—CH$_2$— | do | 147 to 148. |
| 0 | CH$_3$CH$_2$—CH(CH$_2$Cl)— | do | 145 to 146. |
| 0 | CH$_3$— | do | 129 to 130. |
| 0 | CH$_3$—C(CH$_3$)$_2$— | do | 166 to 167. |
| 0 | CH$_3$—C(CH$_3$)$_2$—CH$_2$—C(CH$_3$)$_2$— | do | 110 to 111. |
| 0 | Cl—CH$_2$CH$_2$— | do | 150 to 151. |
| 0 | CH$_3$—CH(Cl)—CH$_2$— | do | 124 to 125. |

| X | R | R' | M.P., °C. |
|---|---|---|---|
| 0 | CH₃\CH— / CH₃CH₂ | ...do... | 138 to 139. |
| 0 | (bicyclic structure) | ...do... | With decomposition. |
| 0 | (cyclohexyl-like structure) | ...do... | Difficulty crystallized oil. |
| 0 | (cyclic structure) | ...do... | Difficulty crystallized oil. |
| 0 | (bicyclic structure) | ...do... | Difficulty crystallized oil. |
| 0 | CH₃—(bicyclic structure) | ...do... | 135 to 138. |
| 0 | CH₃—(bicyclic)—CH₃ | —CH(CH₃)(C≡CH) | 48 to 50. |
| 0 | (cyclic structure) | —CH(CH₃)(C≡CH) | 166 to 168. |
| 0 | (phenyl)—R'''=CH₃ | —CH₃ | 125 to 126. |

| X | R | R' | R''' | M.P.,°C. |
|---|---|---|---|---|
| 0 | γ-chloropropyl | CH₃ | H | 110 to 114. |
| 0 | phenyl | CH₃ | H | 144 to 146. |
| 0 | pentacyclo-(3,2,1,1,0,0)-pentadecenyl | CH₃ | H | 158 to 161. |
| 0 | 2-bicyclo-(3,3,0)-octyl | C₄H₅ | H | Non-crystallized oil. |
| 0 | bicyclo-(2,2,1)-heptyl | C₄H₅ | H | 164 to 170. |
| 0 | 4- or 5-tricyclo-(3,2,1,0)-decyl | C₃H₇iso | H | Non-crystallized oil. |
| 0 | 2-ethylhexyl | C₃H₇iso | H | |
| 0 | 2-ethylhexyl | C₄H₅ | H | |
| 0 | (bicyclic structure) | C₄H₅ | H | |
| 0 | methyl | C₃H₇iso | H | |
| 0 | isopropyl | CH₃ | H | 166.5 to 168. |
| 0 | (phenyl structure) | CH₃ | (phenyl) | |
| 0 | methyl | CH₃ | CH₃ | |
| 0 | isopropyl | CH₃ | isoC₃H₇ | 112 to 113. |
| 0 | ethyl | CH₃ | C₂H₅ | 91 to 92. |

The following experiments illustrate the good action of the compounds prepared according to this invention.

EXPERIMENT 1

In a greenhouse the plants beet (*Beta vulgaris*), chickweed (*Stellaria media*), white goosefoot (*Chenopodium album*), small nettle (*Urtica urens*), chamomile (*Matricaria chamomilla*), wild mustard (*Sinapis arvensis*) and annual meadow grass (*Poa annua*) were treated post emergence at a growth height of 2 to 10 cm. and cotton (*Gossypium sp.*) and Indian corn (*Zea mays*) were treated by the layby method with 2 kg. of 3-(4'-fluorophenylcarbamoyl)-hydroxyphenylmethyl carbamate (I) per hectare dispersed in 500 liters of water. One to two weeks later it could be observed that the weeds chickweed, white Goosefoot, small nettle, chamomile, wild mustard and annual meadow grass had almost completely withered whereas the beet, cotton and Indian corn continued to grow normally.

EXPERIMENT 2

An agricultural plot which was infested with chickweed (*Stellaria media*), white goosefoot (*Chenopodium album*), small nettle (*Urtica urens*), chamomile (*Matricaria chamomilla*), wild mustard (*Sinapis arvensis*) and annual meadow grass (*Poa annua*) was sprayed at a growth height of the weeds of 3 to 7 cm. with 3-(4'-fluorophenylcarbamoyl)-hydroxyphenylmethyl carbamate (I) at a rate of 5 kg. of active ingredient per hectare dispersed in 500 liters of water. Five to eight days later it could be observed that the weeds had almost completely withered. New crops were then grown in the field without damage to the plants.

The following compounds have the same biological action as I in Experiments 1 and 2:

3-(3'-trifluoromethylphenylcarbamoyl)-hydroxyphenylmethyl carbamate
3-(phenylcarbamoyl)-hydroxyphenylmethyl carbamate
3-(3'-anisidylcarbamoyl)-hydroxyphenylbutyn-(1)-yl-(3) carbamate
3-(3'-toluylcarbamoyl)-hydroxyphenylbutyn-(1)-yl-(3) carbamate
3-(2'-carbomethoxyphenylcarbamoyl)-hydroxyphenylmethyl carbamate
3-(tetrahydrodicyclopentadienylcarbamoyl)-hydroxyphenylmethyl carbamate
3-(2',3',6'-trichlorobenzylcarbamoyl)-hydroxyphenylmethyl carbamate
3-(3',4'-dichlorophenylcarbamoyl)-hydroxyphenylmethyl carbamate
3-(β-chloropropylcarbamoyl)-hydroxyphenylmethyl carbamate
3-(tert-octylcarbamoyl)-hydroxyphenylmethyl carbamate
3-(sec-butylcarbamoyl)-hydroxyphenylmethyl carbamate
3-(2'-ethylhexylcarbamoyl)-hydroxyphenylmethyl carbamate
3-(3'-aminophenylcarbamoyl)-hydroxyphenylmethyl carbamate
3-(iso-butylcarbamoyl)-hydroxyphenylmethyl carbamate
3-(tert-butylcarbamoyl)-hydroxyphenylmethyl carbamate
3-(isoamylcarbamoyl)-hydroxyphenylmethyl carbamate
3-(β-methoxypropylcarbamoyl)-hydroxyphenylmethyl carbamate
3-(β-ethoxypropylcarbamoyl)-hydroxyphenylmethyl carbamate
3-(tert-octylcarbamoyl)-hydroxyphenylethyl carbamate
3-(tert-octylcarbamoyl)-hydroxyphenyl-(β-methoxyethyl) carbamate
3-(β-bromopropylcarbamoyl)-hydroxyphenyl-(2-ethylhexyl) carbamate
3-(2'-methylcyclohexylcarbamoyl)-hydroxyphenylmethyl carbamate
3-(2'-isopropylphenylcarbamoyl)-hydroxyphenylmethyl carbamate
3-(bicyclo-[3,3,0]-octylcarbamoyl)-hydroxyphenylmethyl carbamate
3-(2'-methylnorbornylcarbamoyl)-hydroxyphenylmethyl carbamate
3-(tricyclo-[3,2,1,0]-decenylcarbamoyl)-hydroxyphenylmethyl carbamate
3-(3'-chlorophenylcarbamoyl)-hydroxyphenylmethyl carbamate
3-(3'-fluorophenylcarbamoyl)-hydroxyphenylmethyl carbamate
3-(3'-chloromethylphenylcarbamoyl)-hydroxyphenylmethyl carbamate
3-(3'-methylcyclohexylcarbamoyl)-hydroxyphenyl-sec-butyl carbamate
3-(3'-methylsulfonylphenylcarbamoyl)-hydroxyphenylmethyl carbamate
3-(3'-nitrophenylcarbamoyl)-hydroxyphenylmethyl carbamate
3-(3'-carbomethoxycarbamoyl)-hydroxyphenylmethyl carbamate
3-(3'-cyanophenylcarbamoyl)-hydroxyphenylmethyl carbamate
3-(benzylcarbamoyl)-hydroxyphenylmethyl carbamate.

EXPERIMENT 3

Plastic pots with a diameter of 8 cm. were filled with loamy sandy soil in a greenhouse and the seeds of rice (*Gossypium* sp.), Indian corn (*Zea mays*), peas (*Pisum sativum*), chickweed (*Stellaria media*), white goosefoot (*Chenopodium album*), small nettle (*Urtica urens*), chamomile (*Matricaria chamomilla*), wild mustard (*Sinapis arvensis*) and annual meadow grass (*Poa annua*), slender foxtail (*Alopecurus myosuroides*) and barnyard grass (*Panicum crus galli*) were sown therein. The soil prepared in this way was treated with 3-(isopropylcarbamoyl)-hydroxyphenylmethyl carbamate (I) and, for comparison, with N-3,4-dichlorophenylmethyl carbamate (II), each at a rate of 3 kg. of active ingredient per hectare, dispersed in 500 liters of water. After four to five weeks it could be observed that I had a stronger herbicidal action than II. The action can be seen in the following table.

|  | Active ingredient | |
|---|---|---|
|  | I | II |
| Crop plants: |  |  |
| Rice | 0 | 0 |
| Cotton | 0 | 0-10 |
| Indian corn | 10 | 0 |
| Peas | 0-10 | 10 |
| Undesirable plants: |  |  |
| Chickweed | 80 | 60-70 |
| White goosefoot | 100 | 70 |
| Small nettle | 100 | 70 |
| Chamomile | 90-100 | 50 |
| Wild mustard | 100 | 80 |
| Annual meadow grass | 90-100 | 70 |
| Slender foxtail | 80 | 60 |
| Barnyard grass | 80 | 30 |

NOTE: 0=No damage; 100=Complete kill.

EXPERIMENT 4

In a greenhouse the plants rice (*Oryca sativa*), cotton (*Gossypium* sp.) and Indian corn (*Zea mays*) were treated by the layby method and peas (*Pisum sativum*), chickweed (*Stellaria media*), white goosefoot (*Chenopodium album*), small nettle (*Urtica urens*), chamomile (*Matricaria chamomilla*), wild mustard (*Sinapis arvensis*) and annual meadow grass (*Poa annua*), slender foxtail (*Alopecurus myosuroides*) and barnyard grass (*Panicum crus galli*) were treated in the usual manner at a growth height of 2 to 10 cm. with 3-isopropylcarbamoyl)-hydroxyphenylmethyl carbamate (I) and, for comparison, with N-3,4-dichlorophenylmethyl carbamate (II) each at a rate of 3 kg. of active ingredient per hectare dispersed in 500 liters of water. Three to four weeks later it could be observed that I had a stronger action than II. The herbicidal action can be seen from the following table.

|  | Active ingredient | |
|---|---|---|
|  | I | II |
| Crop plants: |  |  |
| Rice | 0 | 0 |
| Cotton | 0-10 | 10-20 |
| Indian corn | 10 | 0 |
| Peas | 10 | 10 |
| Undesirable plants: |  |  |
| Chickweed | 90-100 | 60-70 |
| White goosefoot | 100 | 70-80 |
| Small nettle | 100 | 90 |
| Chamomile | 90-100 | 70 |
| Wild mustard | 100 | 90 |
| Annual meadow grass | 80-90 | 70-80 |
| Slender foxtail | 80 | 60 |
| Barnyard grass | 80 | 50-60 |

NOTE: 0=No damage; 100=Complete kill.

The following compounds have the same biological action as I in Experiments 3, 4, 5 and 6:

3-(isopropylcarbamoyl)-hydroxyphenylisopropyl carbamate 3-(methylcarbamoyl)-hydroxyphenylisopropyl carbamate 3-(methylcarbamoyl)-hydroxyphenylbutyn(1)-yl-(3) carbamate.

EXPERIMENT 5

An experimental plot which had been sown with chickweed (*Stellaria media*), white goosefoot (*Chenopodium album*), small nettle (*Urtica urens*), chamomile (*Matricaria chamomilla*), wild mustard (*Sinapis arvensis*) and annual meadow grass (*Poa annua*), slender foxtail (*Alopecurus myosuroides*) and barnyard grass (*Panicum crus galli*) was sprayed on the day of sowing with 3-(isopropylcarbamoyl)-hydroxyphenylmethyl carbamate (I) and, for comparison, with 2-chloro-4,6-bis-(ethylamino)-s-triazine (II), each a rate of 7.5 kg. of active ingredient per hectare dispersed in 500 liters of water. After three to four weeks it was observed that I had completely destroyed the broadleaved and grass weeds, whereas the weeds treated with II had not completely withered.

EXPERIMENT 6

An agricultural plot which was infested with chickweed (*Stellaria media*), white goosefoot (*Chenopodium album*), small nettle (*Urtica urens*), chamomile (*Matricaria chamomilla*), wild mustard (*Sinapis arvensis*) and annual meadow grass (*Poa annua*), slender foxtail (*Alopecurus myosuroides*) and barnyard grass (*Panicum crus galli*) was sprayed at a growth height of the weeds of 3 to 8 cm. with 3-(isopropylcarbamoyl)-hydroxyphenylmethyl carbamate (I) and, for comparison, with 2-chloro-4,6-bis-(ethylamino)-s-triazine (II), each at a rate of 7.5 kg. of active ingredient per hectare dispersed in 500 liters of water. After eight days the broadleaved and grass weeds treated with I exhibited considerable damage, whereas those treated with II continued to grow normally.

After three weeks almost all the plants were completely withered.

We claim:

1. A biscarbamate of the formula

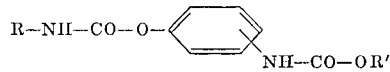

in which R' denotes lower alkyl and R denotes a substituent selected from the class consisting of bicycloalkyl, tricycloalkyl and the radical.

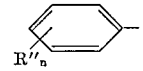

in which $n$ denotes one of the integers 1, 2 or 3, at least one R" denotes lower alkoxy, nitro, cyano, fluoro or trifluoromethyl and the remaining R" substituents denote hydrogen, methyl, chlorine or bromine.

2. 3 - (4' - fluorophenylcarbamoyl) - hydroxyphenylmethyl carbamate.

3. 3 - (3' - trifluoromethylphenylcarbamoyl)-hydroxyphenylmethyl carbamate.

4. 3 - (tetrahydrodicyclopentadienylcarbamoyl) - hydroxyphenylmethyl carbamate.

References Cited

UNITED STATES PATENTS 3,404,975  10/1968  Wilson et al. _____ 260—471

LORRAINE A. WEINBERGER, Primary Examiner

L. A. THAXTON, Assistant Examiner

U.S. Cl. X.R.

71—106, 111; 260—453, 455, 465, 470

PO-1050
(5/69)

UNITED STATES PATENT OFFICE
CERTIFICATE OF CORRECTION

Patent No. 3,551,477          Dated December 29, 1970

Inventor(s)  Karl-Heinz Koenig et al

It is certified that error appears in the above-identified patent and that said Letters Patent are hereby corrected as shown below:

Column 4, under "n", in the table, lines 4, 6, and 7 of the table, "1" should read -- 2 --; line 3 of the table, "2" should read -- 1 --; under "R'", line 63 of the table, "-CH(CH$_3$)(CH$_3$)" should read -- -CH(CH$_3$)(C≡CH) --.

Signed and sealed this 11th day of May 1971.

(SEAL)
Attest:

EDWARD M. FLETCHER, JR.
Attesting Officer

WILLIAM E. SCHUYLER,
Commissioner of Pate